US008656477B2

(12) United States Patent
Maegawa et al.

(10) Patent No.: US 8,656,477 B2
(45) Date of Patent: Feb. 18, 2014

(54) SERVER SYSTEM, COMMUNICATION METHOD, COMPUTER, PROGRAM AND RECORDING MEDIUM

(75) Inventors: Hirotoshi Maegawa, Tokyo (JP); Kazufumi Oyama, Saitama (JP); Jun Hiroi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 722 days.

(21) Appl. No.: 12/600,547

(22) PCT Filed: May 25, 2007

(86) PCT No.: PCT/JP2007/000561
§ 371 (c)(1),
(2), (4) Date: Apr. 13, 2010

(87) PCT Pub. No.: WO2008/146328
PCT Pub. Date: Dec. 4, 2008

(65) Prior Publication Data
US 2011/0010767 A1    Jan. 13, 2011

(51) Int. Cl.
*H04L 29/06*    (2006.01)
(52) U.S. Cl.
USPC ............................. 726/11; 709/223; 709/238
(58) Field of Classification Search
USPC ...................... 726/11; 709/223, 238
See application file for complete search history.

(56) References Cited

U.S. PATENT DOCUMENTS

| | | | |
|---|---|---|---|
| 7,590,758 B2 * | 9/2009 | Takeda et al. | 709/245 |
| 8,281,377 B1 * | 10/2012 | Snow et al. | 726/7 |
| 8,392,699 B2 * | 3/2013 | Jones et al. | 713/150 |
| 2003/0167410 A1 * | 9/2003 | Rigstad et al. | 713/201 |
| 2004/0128540 A1 * | 7/2004 | Roskind | 713/201 |
| 2005/0033985 A1 * | 2/2005 | Xu et al. | 713/201 |
| 2006/0045068 A1 * | 3/2006 | Wu et al. | 370/352 |
| 2006/0080380 A1 * | 4/2006 | Aizu et al. | 709/203 |
| 2006/0149822 A1 * | 7/2006 | Henry et al. | 709/206 |
| 2007/0013946 A1 * | 1/2007 | Gondo et al. | 358/1.15 |
| 2007/0223568 A1 * | 9/2007 | Jiang et al. | 375/222 |
| 2008/0080508 A1 * | 4/2008 | Das et al. | 370/392 |

FOREIGN PATENT DOCUMENTS

| | | | |
|---|---|---|---|
| JP | 11167535 A | | 6/1999 |
| JP | 2004159117 A | | 6/2004 |
| JP | 2004528624 A | | 9/2004 |
| JP | 2005352639 A | | 12/2005 |
| WO | WO 02/058357 A2 * | | 7/2002 |
| WO | 03030482 A2 | | 4/2003 |

OTHER PUBLICATIONS

Office Action for corresponding Japanese Application No. 2009-516071, Oct. 21, 2011.

(Continued)

*Primary Examiner* — Nathan Flynn
*Assistant Examiner* — Sarah Su
(74) *Attorney, Agent, or Firm* — Matthew B. Dernier, Esq.; Gibson & Dernier LLP (57) ABSTRACT

Establishment of communication between client apparatuses and an arithmetic function unit is performed based on communication information acquired by communication using HTTP between the client apparatuses and the arithmetic function unit through a firewall function unit, where the client apparatuses download encrypted contents data from the arithmetic function unit by P2P without passing a firewall.

13 Claims, 9 Drawing Sheets

(56) References Cited

OTHER PUBLICATIONS

International Search Report for corresponding PCT application PCT/JP2007/000561, Sep. 4, 2007.

International Preliminary Report on Patentability for corresponding PCT application PCT/JP2007/000561, Jan. 21, 2010.

* cited by examiner

SERVER SYSTEM, COMMUNICATION METHOD, COMPUTER, PROGRAM AND RECORDING MEDIUM

TECHNICAL FIELD

The present invention relates to a server system, a communication method, a computer, a program, and a storage media used in communication between a server and a client apparatus.

BACKGROUND ART

For example, a server, such as a sales site of the contents on a network is accessed from a terminal, contents are specified to be purchased, and electronic banking is performed. After this, the contents data may be downloaded.

In such a system, one or more firewalls are built at server site, and all of the communication between the server and the terminal is performed through a firewall. This is defending the server from the unjust attack from the computer on a network.

However, in the system of prior art, while the server can be defended from the unjust attack from the computer on the network, when just client apparatus downloads contents data etc, from the server, there is a disadvantage that passing firewall causes bad response.

Further, there is a disadvantage that flexibility of the application construction and execution between the client apparatus and the servers is not enough.

This invention is made in view of this situation, and purpose is to provide a computer, a program, and a storage media which have high safety and a high response.

SUMMARY OF THE INVENTION

In order to attain the purpose the first aspect of the present invention is a server system, comprising: a firewall; a first server for connecting with a client apparatus via said firewall; and a second server for connecting with said client apparatus without passing said firewall, wherein said first server communicates with said client apparatus via said firewall and transmits communication information used for communication with said second server to said client apparatus, said client apparatus communicates with said second server based on a communication protocol different from a communication protocol with said first server by using said communication information received from said first server.

In the server system of the present invention, first, a first server performs communication with a client apparatus through said firewall, and transmits said communication information used for communication with said second server to said client apparatus.

And said client apparatus communicates with said second server based on a different communications protocol from a communication protocol with said first server by using the received communication information.

The second aspect of the present invention is a communication method, comprising: a step in which a first server communicates with a client apparatus via a firewall and transmits communication information used for communication with said second server to said client apparatus, and a step in which said client apparatus communicates with said second server based on a communication protocol different from a communication protocol with said first server by using said communication information received from said first server.

The third aspect of the present invention is a computer, comprising: an interface for transmitting and receiving a data used for communication with a first server through a firewall at the side of server and a data used for communication with a second server not through said firewall, and a processing circuit for performing communication processing with said second server not through said firewall based on a communication protocol different from a communication protocol with said first server by using a communication information received from said first server, when receiving the communication information used for said second server from said first server via said interface by communication through said firewall.

The fourth aspect of the present invention is a program executed by a computer, comprising: a receiving step for receiving a communication information used for communication with a second server by communication with a first server through a firewall at server side, and a communication step for communicating with said second server through said firewall base on a communication protocol different from a communication protocol with said first server by using said communication information received at said receiving step.

The fifth aspect of the present invention is a storage media storing a program executed by a computer, said program comprising: a receiving step for receiving a communication information used for communication with a second server by communication with a first server through a firewall at server side, and a communication step for communicating with said second server through said firewall base on a communication protocol different from a communication protocol with said first server by using said communication information received at said receiving step.

According to the present invention, a computer, a program, and a storage media which have high safety and a high response can be provided.

DETAILED DESCRIPTION OF EMBODIMENTS OF THE INVENTION

Below a network system 1 of the present invention will be explained.

Figure 1:
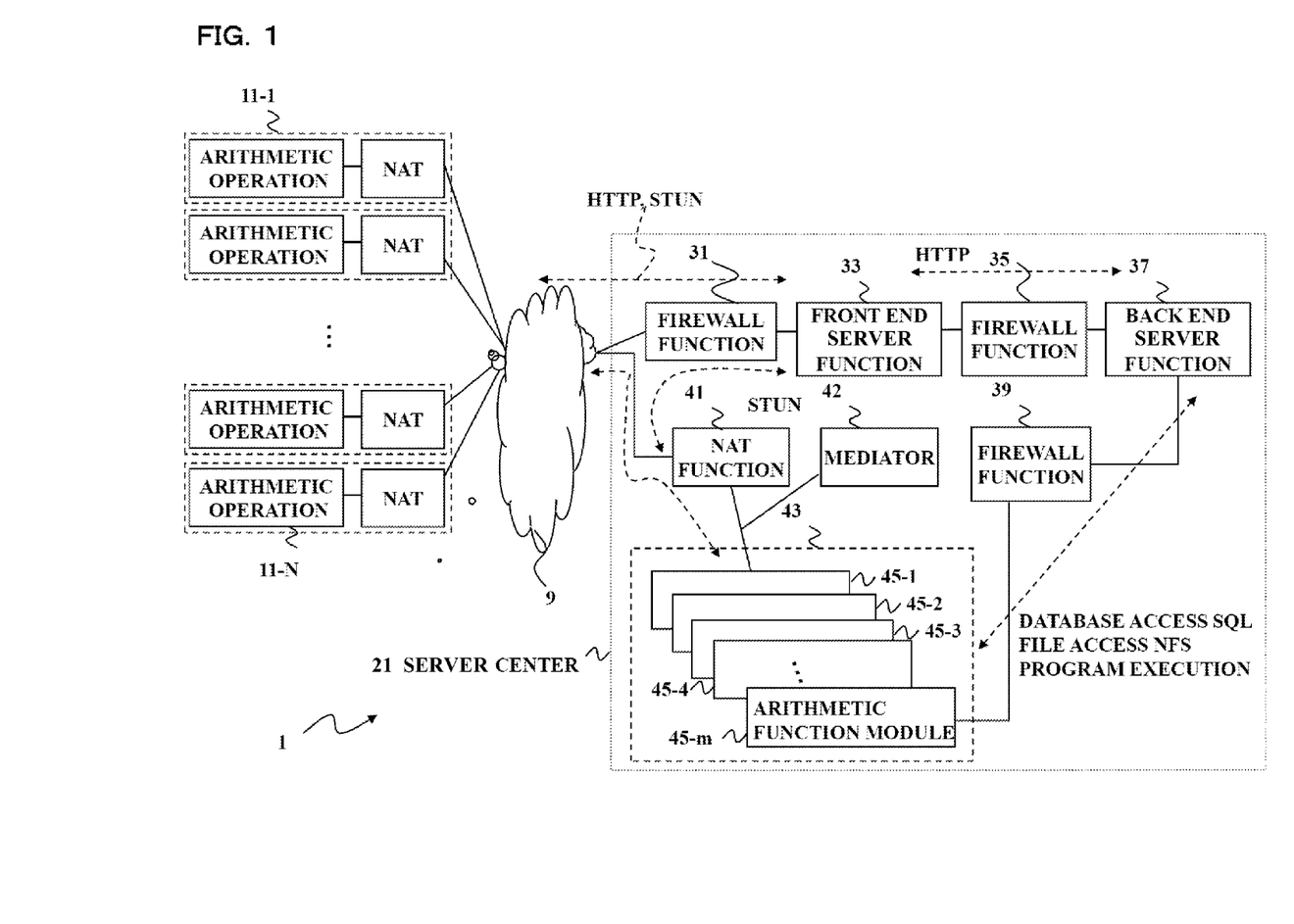
FIG. 1 is a schematic view of a network system in accordance with an embodiment of the present invention.

FIG. 1 is a schematic view of a network system 1 in accordance with an embodiment of the present invention.

Referring to FIG. 1, the network system 1, for example, includes client apparatus 11-$n$ and a server center 21. Here "n" is an integer meeting the condition "$1 \leq n \leq N$".

The front end server function unit 33 is an example of a first server used in the present invention, the arithmetic function unit 43 is an example of a second server used in the present invention.

The client apparatuses 11-$n$ have function of arithmetic operation and NAT.

The server center 21 includes a firewall function unit 31, a front end server function unit 33, a firewall function unit 35, a back end server function unit 37, a firewall function unit 39, a Network Address Translation (NAT) function unit 41, a mediator unit 42 and a arithmetic function unit 43.

The firewall function unit 31 has a function of firewall in communication with the client apparatus via the network 9.

In the present embodiment the function of firewall means a function which applies the policy (rule) specified beforehand to all of the communication which pass a firewall.

The firewall function has functions, such as access restrictions, address translation, user attestation, log collection/analysis, contents filtering, and routing, for example. The firewall function is realized with either Operation System (OS) or application.

The front end server function unit 33 has a server function of Simple Traversal of UDP Through NATs (STUN). That is, the front end server function unit 33 has a unique address (global IP address) in the network 9.

The front end server function unit 33 assigns the global IP address to the arithmetic function unit 43 by communicating with the arithmetic function unit 43 to which the global IP address is not assigned through the communication lines in the server center 21 by using the STUN function. The global IP addresses are 128 bit data, for example.

The front end server function unit 33 transmits the above-mentioned global IP address which is assigned to the arithmetic function unit 43 as a connection information to the client apparatuses 11-$n$.

The above-mentioned global IP address assigned to the arithmetic function unit 43 is mutually converted between the internal address which specifies the arithmetic function unit 43 for communication by the NAT function of the NAT function unit 41 while communicating between the client apparatuses 11-$n$ and the arithmetic function unit 43.

Note that, the communication based on the STUN function between the front end server function unit 33 and the arithmetic function unit 43 is performed through the path in the server center 21.

Further, preferably, a global IP address is assigned suitably to the client apparatuses 11-$n$ by using the NAT function of the NAT function unit 41 and is suitably used for communication.

Protocols, such as HyperText Transfer Protocol (HTTP), are used for communication between the client apparatuses 11-$n$ and front end server function unit 33 in the present embodiment. In the present embodiment, the communication between the client apparatuses 11-$n$ and the front end server function unit 33 is used for the processing in which high security, such as credit settlement of accounts, is required The firewall function unit 35 has a firewall function in communication between the front end server function unit 33 and back end server function unit 37.

The back end server function unit 37 executes programs, such as file system share related processing of the database access processing and NFS, etc. based on SQL etc.

The back end server function unit 37 transmits the contents data, predetermined contents space data, etc. to the arithmetic function unit 43 based on the above-mentioned program.

The firewall function unit 39 has a firewall function in communication between the back end server function unit 37 and the arithmetic function unit 43.

The mediator unit 42 provides the client apparatuses 11-$n$ with application information.

The arithmetic function unit 43 has two or more arithmetic function modules 45-1 to 45-$m$, and each performs the application program AP-S.

The arithmetic function unit 43 transmits the contents data of image data, such as audio data of a musical piece etc., and an album jacket picture, etc. to the client apparatuses 11-$n$ based on the application program AP-S.

Further, the arithmetic function unit 43 transmits the coordinates of each contents in predetermined space and the text data indicating a bibliographic matter, etc. to the client apparatuses 11-$n$, for example.

At this time, transmission to the client apparatuses 11-$n$ from the arithmetic function unit 43 is performed by encrypting transmission data. For example the client apparatuses 11-$n$ acquires an encryption key by communication with the firewall function unit 31, and performs communication with the arithmetic function unit 43 by using the encryption key.

In the present embodiment, P2P type communications protocols different from a communication protocol with the client apparatuses 11-$n$ and the firewall function unit 31 are used for communication between the client apparatuses 11-$n$ and the arithmetic function unit 43. That is, a direct communication is performed between the client apparatuses 11-$n$ by using the above-mentioned global IP address assigned to the arithmetic function unit 43.

This P2P direct communication is possible also to a plurality of the client apparatuses 11-$n$ or a plurality of the arithmetic function unit 43. In that case, mutual address reference uses the Fully Connected Graph (FCG) system holding all references mutually. Of course, other methods, such as a Chord system by Distributed Hash Table (DHT) which manages a reference in a hash table and makes it distribute to nodes are available.

The arithmetic function unit 43 receives contents data etc. through the firewall function unit 39 by the database access processing and file system share related processing provided by the back end server function unit 37.

[Client Apparatuses 11-$n$]

The client apparatuses 11-$n$ is electric devices, such as a game machine, a personal computer, or a portable telephone.

Figure 2:
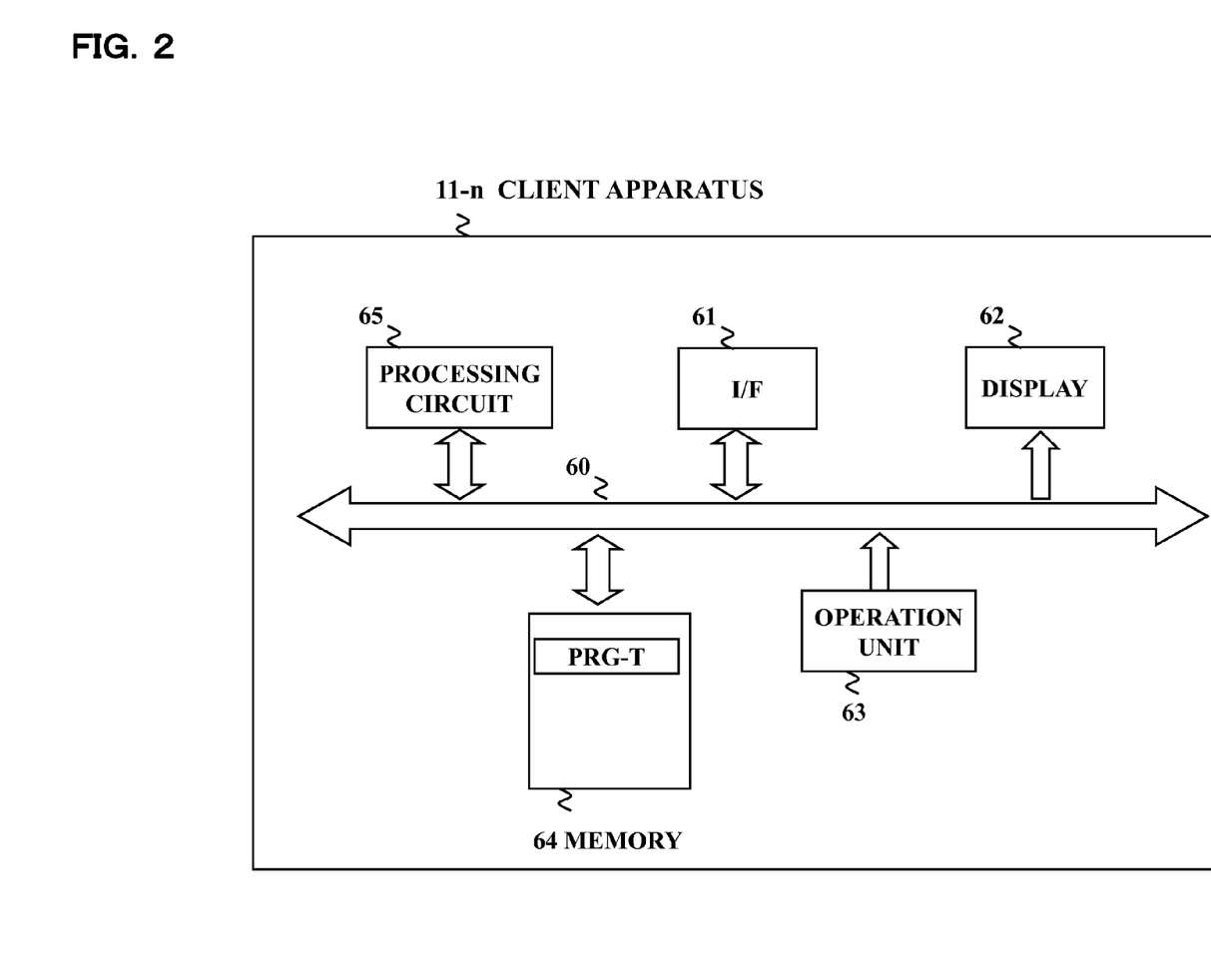
FIG. 2 is a block diagram of the client apparatuses shown in FIG. 1.

FIG. 2 is a block diagram of the client apparatuses 11-$n$ shown in FIG. 1.

As shown in FIG. 2, the client apparatuses 11-$n$ includes an interface 61, a display 62, an operation unit 63, a memory 64 and a processing circuit 65, all coupled over a bus 60.

The interface 61 is an interface for transmitting and receiving data through the network 9.

The display 62 displays a screen according to the image data which the processing circuit 65 generates.

The operation unit 63 is an operation means such as a keyboard.

The memory 64 stores a client application program PRG-T executed by the [55]. The memory 64 is any of recording media such as a semiconductor memory, an optical disc, a magneto-optical disc, a magnetic disk, and so on.

The processing circuit 65 executes the client application program PRG-T and controls generally processing of the client apparatuses 11-$n$ explained in the present embodiment.

[Front End Server Function Unit 33]

Figure 3:
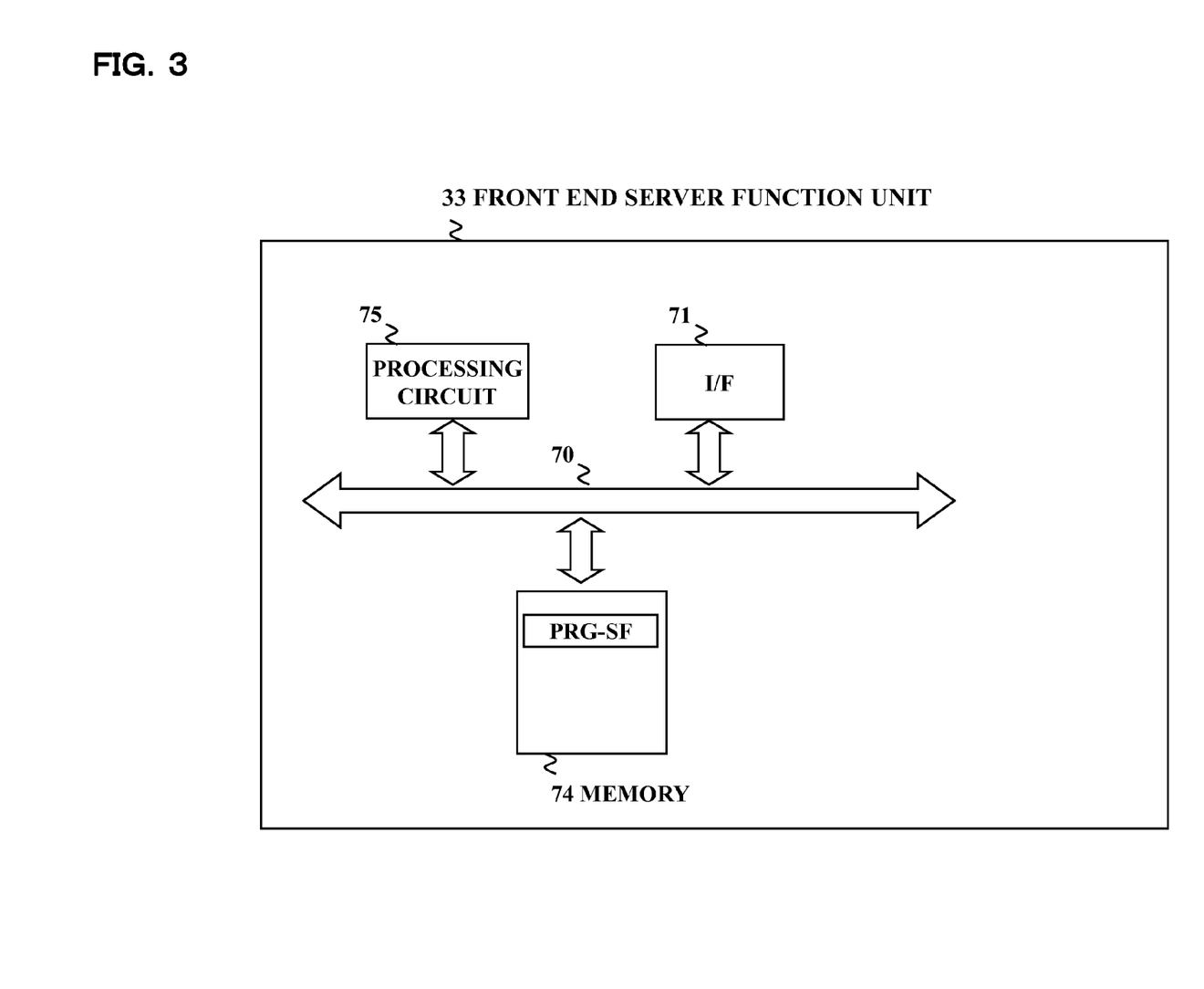
FIG. 3 is a block diagram of the front end server function unit shown in FIG. 1.

FIG. 3 is a block diagram of the front end server function unit 33 shown in FIG. 1.

As shown in FIG. 3, the front end server function unit 33 includes an interface 71, a memory 74 and a processing circuit 75, all coupled over a bus 70.

The interface 71 is an interface for transmitting and receiving data through the network 9.

The memory 74 stores a server application program PRG-SF executed by the processing circuit 75. The memory 74 is any of recording media such as a semiconductor memory, an optical disc, a magneto-optical disc, a magnetic disk, and so on.

The processing circuit 75 executes the server application program PRG-SF and controls generally processing of the front end server function unit 33 explained in the present embodiment.

The processing circuit 75 executes the server application program PRG-SF and controls generally operation of the front end server function unit 33.

[Arithmetic Function Unit 43]

Figure 4:
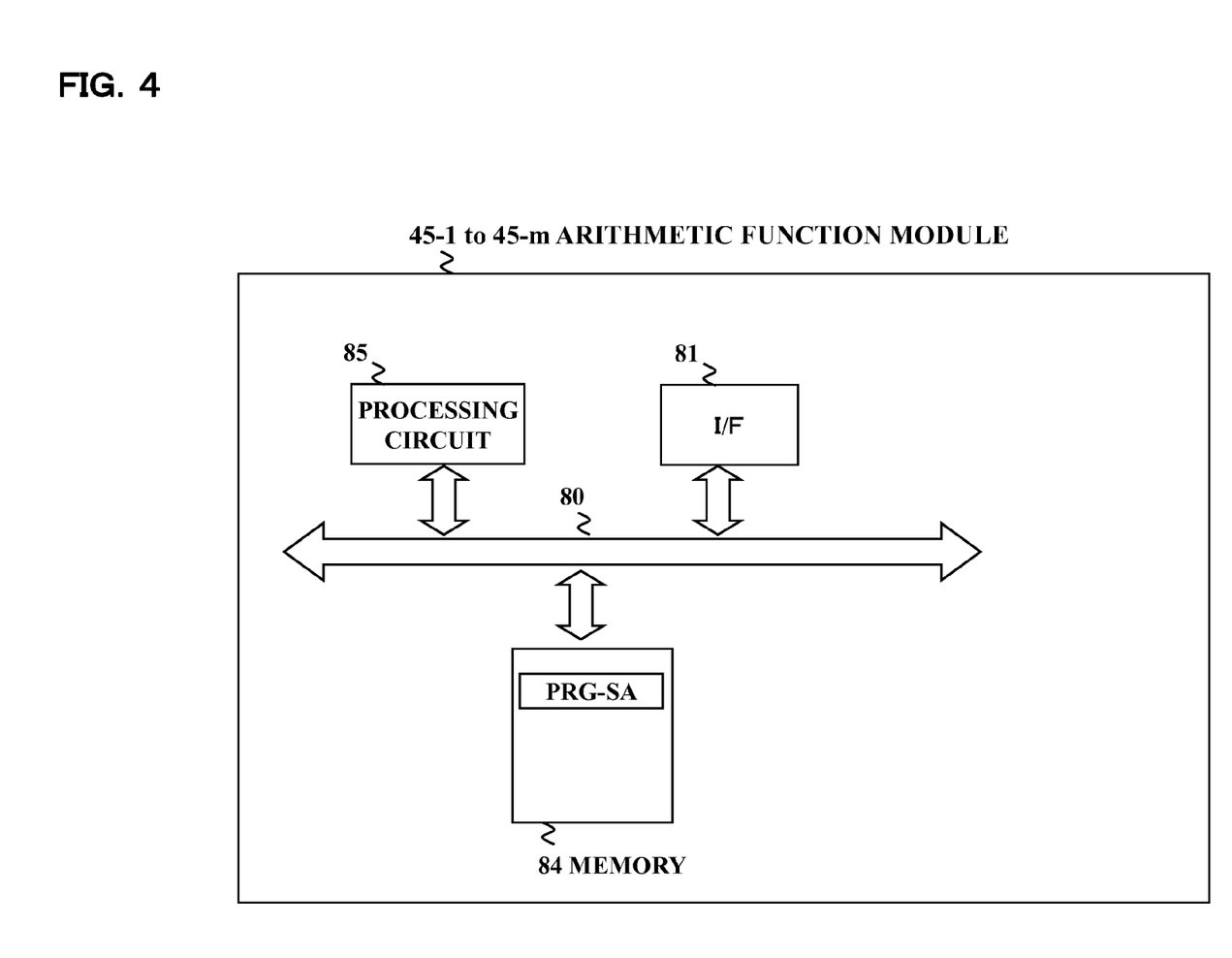
FIG. 4 is a block diagram of the arithmetic function unit which exists in the arithmetic function unit shown in FIG. 1.

FIG. 4 is a block diagram of the client apparatuses 45-1 to 45-$m$ which exist in the arithmetic function unit 43 shown in FIG. 1.

As shown in FIG. 4, the client apparatuses 45-1 to 45-$m$ include an interface 81, a memory 84 and a processing circuit 85, all coupled over a bus 80.

The processing circuit 85 of the client apparatuses 45-1 to 45-$m$ are configured by at least one management processor and two or more calculation execution processors. Processing of two or more above-mentioned calculation execution processors is managed by the management processor, for example.

Here, as a communications protocol between the client apparatuses 11-$n$ and the front end server function unit 33, the server initiative type of HTTP etc. is used, for example. On the other hand, as a communications protocol between the client apparatuses 11-$n$ and the arithmetic function unit 43, a P2P type communications protocol etc. is used as mentioned above.

The arithmetic function unit 43, for example, when processing while communicating with the client application program PRG-T of two or more client apparatuses 11-$n$, makes each of the plurality of the calculation execution processors execute the server application program PRG-SA which performs communication with the client application program PRG-T which corresponds to each of the plurality of the calculation execution processors among the client application program PRG-T.

The processing circuit 85 encrypts the contents data concerned with a predetermined encryption key, when transmitting contents data etc. to for example, the client apparatuses 11-$n$.

The processing circuit 85 uses the encryption key specified by communication between the client apparatuses 11-$n$ and the front end server function unit 33. Thus, by encrypting the contents data, even when communication between the client apparatuses 11-$n$ and the arithmetic function unit 43 is monitored, the contents data can be protected.

The interface 81 is an interface for transmitting and receiving data through the network 9.

The memory 84 stores a server application program PRG-SA executed by the processing circuit 75. The memory 84 is any of recording media such as a semiconductor memory, an optical disc, a magneto-optical disc, a magnetic disk, and so on.

The processing circuit 85 executes the server application program PRG-SA and controls generally processing of the arithmetic function unit 43 explained in the present embodiment.

Figure 5:
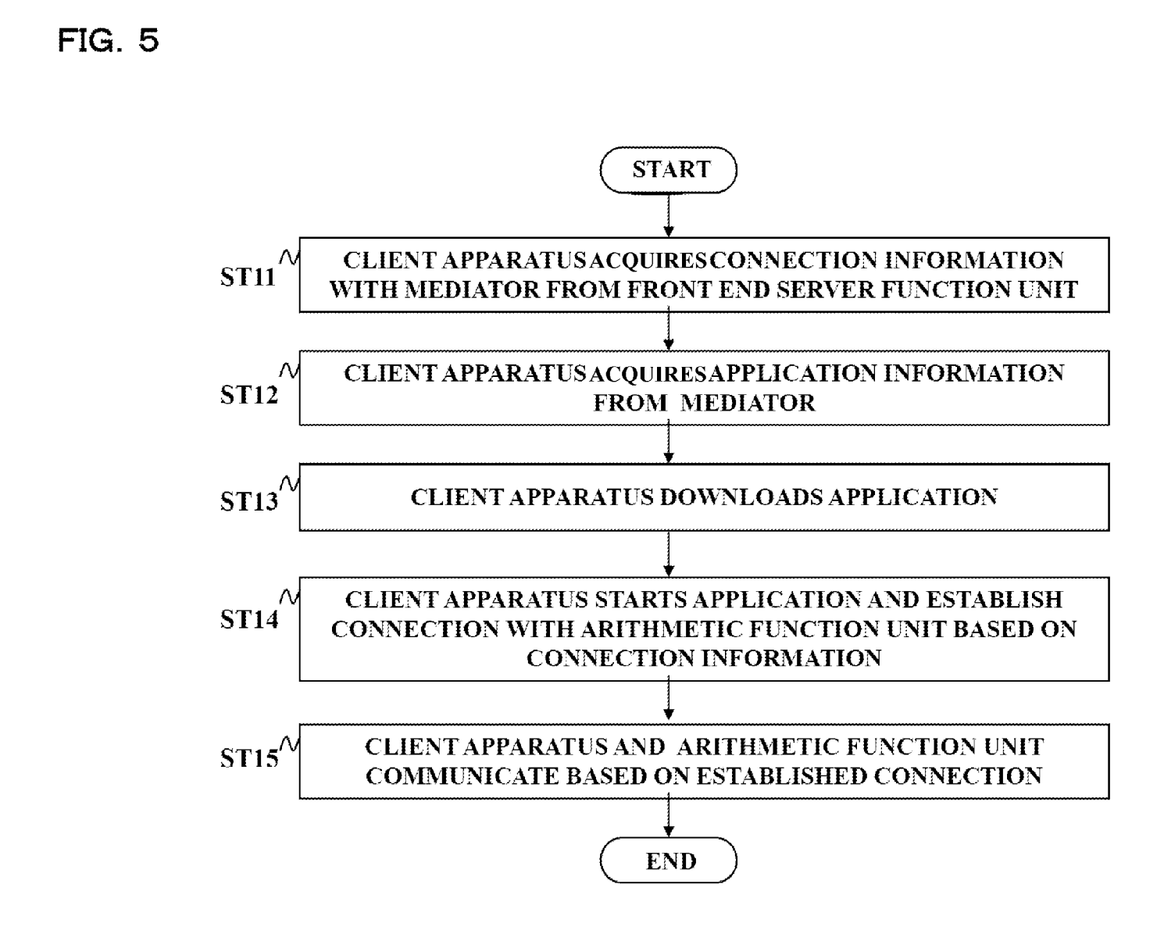
FIG. 5 is a flow chart for explaining connection operation between client and server

Connection operation between the client and the server:

FIG. 5 is a flow chart for explaining connection operation between client and server.

Hereafter, each step shown in FIG. 5 will be explained.

Step ST11:

The processing circuit 65 of the client apparatuses 11-$n$, for example, communicates with the front end server function unit 33 through the network 9 and the firewall function unit 31, and acquires the connection information with the mediator unit 42 by the function of the STUN server of the front end server function unit 33.

The connection information is information on a global IP address, a port, etc. assigned to the mediator unit 42, for example.

The above-mentioned communication is performed in the secure state through the firewall function unit 31 based on a communications protocols, such as HTTP.

Step ST12:

Based on the connection information acquired at the step ST11, the processing circuit 65 of the client apparatuses 11-$n$ accesses the mediator unit 42 through the NAT function unit 41 to receive the application information from the mediator unit 42.

Note that, the mediator unit 42 transmits the application information corresponding to the server application program which the arithmetic function unit 43 executes to the client apparatuses 11-$n$. The application information concerned is introduction of the contents of application which is available to the client apparatuses 11-$n$.

Step ST13:

The processing circuit 65 of the client apparatuses 11-$n$ downloads the client application program PRG-T from a predetermined site based on the application information acquired at the step ST12.

In addition, the client equipment client apparatuses 11-$n$ may download the client application program PRG-T from the front end server function unit 33 or the mediator unit 42.

Step ST14:

The processing circuit 65 of the client apparatuses 11-$n$ performs the client application program PRG-T downloaded by step ST13. The processing circuit 65 of the client apparatuses 11-$n$ accesses the front end server function unit 33 through the network 9 and the firewall function unit 31, based on above-mentioned client application program PRG-T.

And the processing circuit 65 of the client apparatuses 11-$n$ acquires the global IP address and port information of the arithmetic function unit 43, and establishes connection with the arithmetic function unit 43 by the STUN server function of the front end server function unit 33.

Note that, the arithmetic function unit 43 has a plurality of the arithmetic function modules 45-1 to 45-$m$. Each of the arithmetic function modules 45-1 to 45-$m$ executes a server application program individually. At this time, the combination of a unique IP address and a unique port is assigned to each of the arithmetic function modules 45-1 to 45-$m$. Then the arithmetic function modules 45-1 to 45-$m$ perform communication with the client apparatuses 11-$n$ based on the combination information on the IP address and port corresponding to the application program executed by the arithmetic function modules 45-1 to 45-$m$.

Note that, the client apparatuses 11-$n$ and the arithmetic function unit 43 which communicates with the client apparatuses 11-$n$ acquires or specifies the encryption key used for communication between the client apparatuses 11-$n$ and the arithmetic function unit 43 by the communication at the step ST14.

Step ST15:

The processing circuit 65 of the client apparatuses 11-$n$ communicates with the arithmetic function unit 43 based on the connection established at the step ST14. In the communication concerned, a P2P other than HTTP type communications protocol is used as mentioned above.

At this time, the arithmetic function unit 43 performs server application program PRG-SA corresponding to the client apparatuses 11-$n$. The server application program PRG-SA concerned is started by the front end server function unit 33. The timing to be started concerned is the timing when the client apparatuses 11-$n$ has downloaded the client application program PRG-T, or the timing when starting.

By the communication concerned, the client apparatuses 11-$n$ downloads the encrypted contents data from the arithmetic function unit 43 and writes it in cache memory.

The client apparatuses 11-$n$ decodes the contents data using the encryption key acquired by the communication between the front end server function unit 33 at the time of download or use.

[Example of Automatic Cruise Operation]

The example of automatic cruise in which the download of the contents data mentioned above is adopted hereafter is explained.

Automatic cruise operation is operation which specifies the coordinates of the contents data concerned based on the attribute of contents data in predetermined space, and makes the user coordinates (camera position mentioned later) move automatically in the space concerned for example, and reproduces etc, the contents data corresponding to the user coordinates.

In the automatic cruise operation concerned, the contents data corresponding to the coordinates is downloaded with movement of the user coordinates in space. In addition, movement of the user coordinates in space may switch autocruise (automatic) and manual operation, and either is good.

Figure 6:
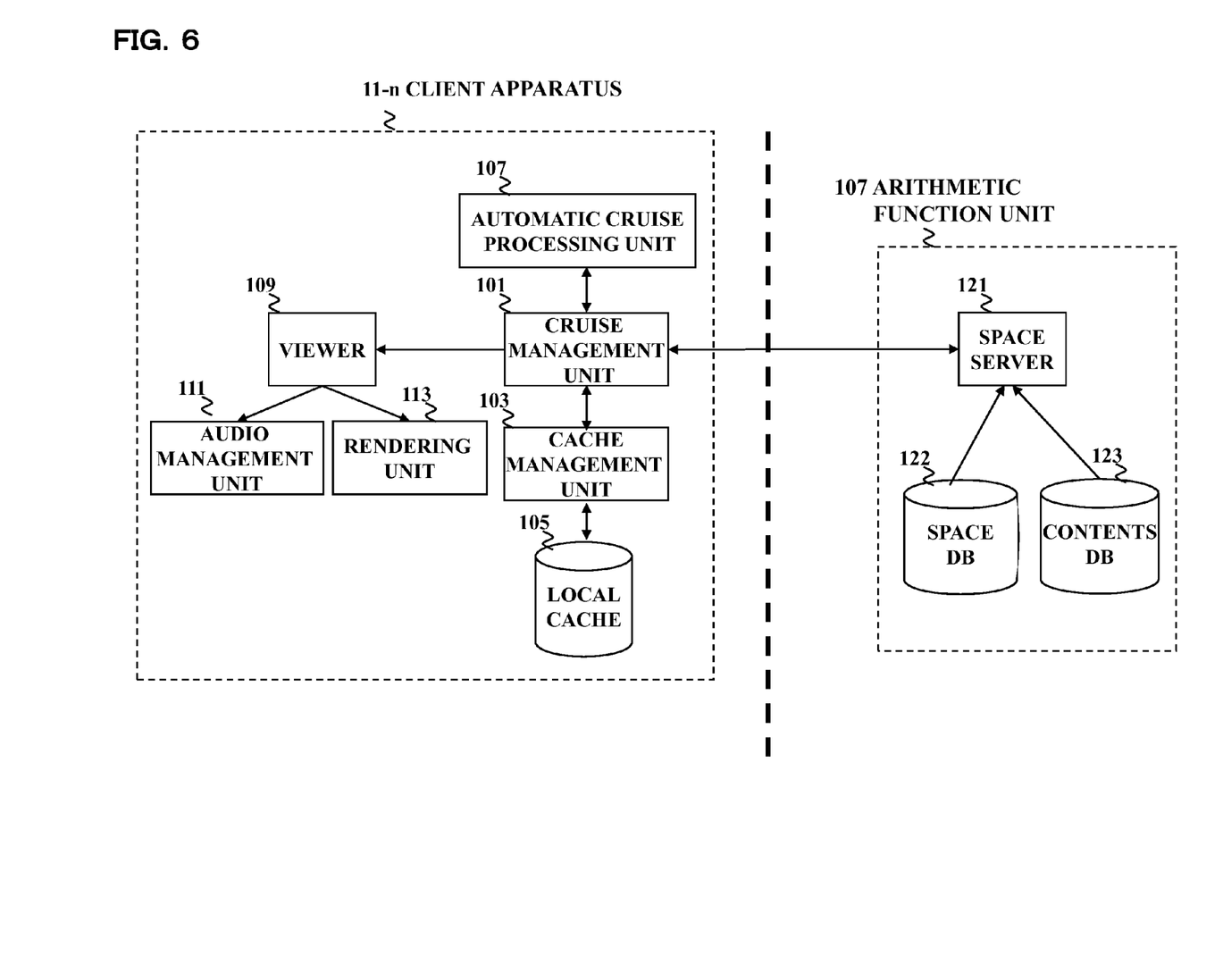
FIG. 6 is a block diagram in the case of carrying out auto-cruise operation in the network system shown in FIG. 1.

FIG. 6 is a block diagram in the case of carrying out automatic cruise operation in the network system 1 shown in FIG. 1.

As shown in FIG. 6, the client apparatuses 11-$n$ includes a cruise management unit 101, a cache management unit 103, a local cache 105, a automatic cruise processing unit 107, a viewer 109, a audio management unit 111 and a rendering unit 113 as functions, for example.

The processing circuit 65 shown in FIG. 2 executes the client application program PRG-T, and the above-mentioned function of the client apparatuses 11-$n$ shown in FIG. 6 is realized.

Further, the arithmetic function unit 43 in the server center 21 includes the space server function 121, the space database 122, and the contents database 123 as a function, for example.

The processing circuit 85 shown in FIG. 4 executes the server application program PRG-SA, and the above-mentioned function of the arithmetic function unit 43 shown in FIG. 6 is realized.

Figure 7:
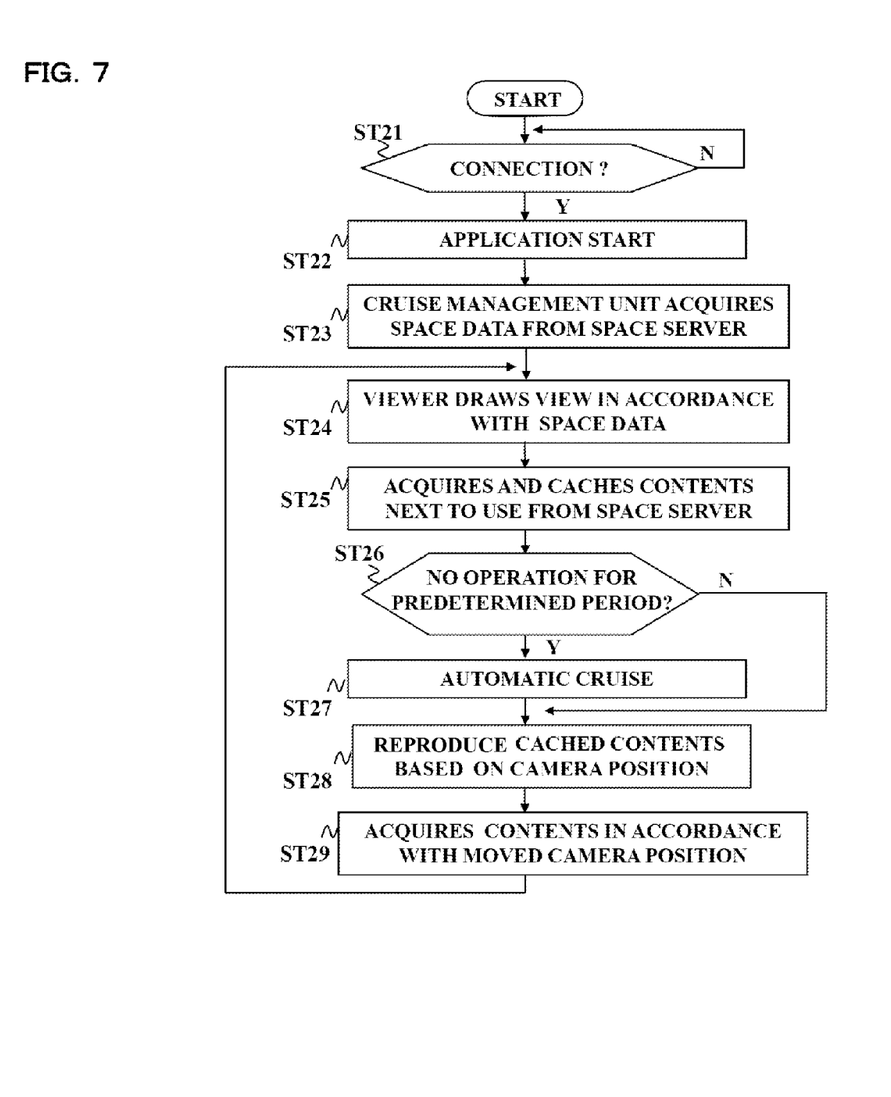
FIG. 7 is a flow chart for explaining the above-mentioned auto-cruise operation.

FIG. 7 is a flow chart for explaining the above-mentioned automatic cruise operation.

Step ST21:

The processing circuit 65 of the client apparatuses 11-$n$ judged whether connection between the server center 21 and the arithmetic function unit 43 has established or not by using the processing mentioned above, for example. And when the processing circuit 65 judged the connection has established, it progresses to step ST22.

Step ST22:

The processing circuit 65 of the client apparatuses 11-$n$ starts the client application program PRG-T downloaded at the step ST13 shown in FIG. 5.

Starting of the client application program PRG-T by the processing circuit 65 may be performed by the command from the front end server function unit 33, for example. Thereby, each functional block in the client apparatuses 11-$n$ shown in FIG. 6 is started.

Step ST23:

The cruise management unit 101 shown in FIG. 6 receives space data and contents data from the space server function 121. The space server function 121 acquires space data from the space database 122, and acquires contents data from the contents database 123.

Specifically, based on the server application program PRG-SA, the processing circuit 85 of the arithmetic function unit 43 shown in FIG. 4 receives space data and contents data through the firewall function unit 39 from the back end server function unit 37, and, encrypts this.

And the processing circuit 85 transmits the encrypted contents data to the client apparatuses 11-$n$, based on the connection established at the step ST14 of FIG. 5.

The cruise management unit 101 of the client apparatuses 11-$n$ writes the space data and contents data which were received in the local cache 105 based on the function of the cache management unit 103.

Step ST24:

The viewer 109 of the client apparatuses 11-$n$ reads space data and contents data from the local cache 105, and displays the view (screen) according to it on a display 62.

Step ST25:

The cruise management department 101 of the client apparatuses 11-$n$ acquires the space data and contents data which are used for the next from the space server function 121, and writes this in the local cache 105.

Step ST26:

If the cruise management unit 101 of the client apparatus 11-$n$ judged that the operation unit 63 shown in FIG. 2 has not generated an operational signal (operation by a user is not performed) during a fixed period, it progresses to step ST27, and when that is not right, it will progress to step ST28.

Step ST27:

The cruise management unit 101 switches to control by the automatic cruise processing unit 107.

Step ST28:

The viewer 109 of the client apparatuses 11-$n$ reads the contents data corresponding to the camera position (object in the contents space displayed as a view) determined by the automatic cruise processing unit 107 from the local cache 105, and image reproduction is carried out in the rendering unit 113.

The audio management unit 111 reproduces the audio data of the contents data corresponding to the above-mentioned camera position.

Step ST29:

The cruise management unit 101 of the client apparatuses 11-$n$ acquires the space data and contents data which are used for the next from the space server function 121 according to the moved camera position, and writes this in the local cache 105.

Then, the cruise management unit 101 returns to processing of step ST24.

[Example of Operation at the Time of a Client Addition]

Figure 8:
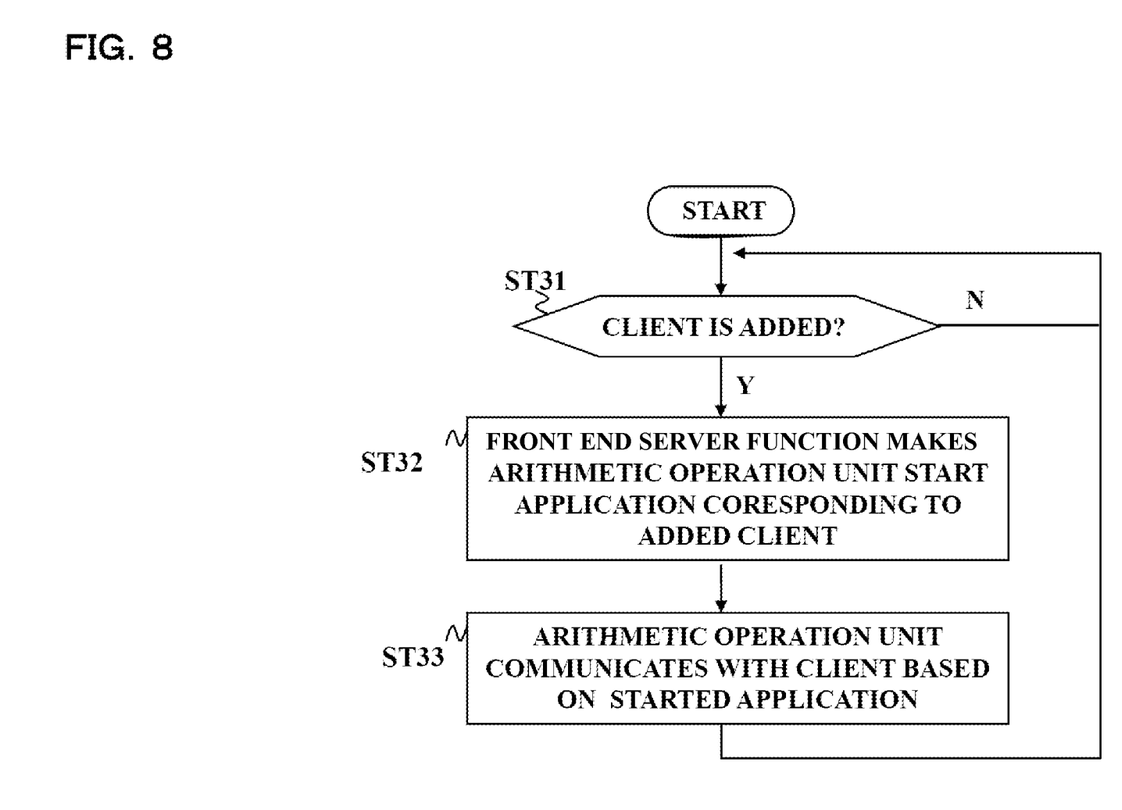
FIG. 8 is a flow chart for explaining an example of operation when new client apparatus is added to the network system 1 shown in FIG. 1.

FIG. 8 is a flow chart for explaining an example of operation when a new client apparatuses 11-$n$ is added to the network system 1 shown in FIG. 1.

Step ST31:

If the processing circuit 75 of the front end server function unit 33 judges that the new client apparatuses 11-*n* has been added by the demand from the client apparatuses 11-*n*, it will progress to step ST32.

Step ST32:

The processing circuit 75 of the front end server function unit 33 specifies the server application program PRG-SF corresponding to the client application program PRG-C which the added client apparatuses 11-*n* executes.

And the processing circuit 75 makes the arithmetic function unit 43 start the specified server application program PRG-SF.

Step ST33:

The arithmetic function unit 43 communicates with the client apparatuses 11-*n* based on the server application program PRG-SF started at the step ST32.

[Example of Operation for Switching Communication]

When the processing of settlement of accounts etc. occurs during communication between the client apparatuses 11-*n* and the arithmetic function unit 43, the communication will be switched to the communication between the client apparatuses 11-*n* and the front end server function unit 33 via the firewall function unit 31.

And after settlement of the accounts is completed by communication in secure state between the client apparatuses 11-*n* and the front end server function unit 33, the communication switches to the P2P communication between the client apparatuses 11-*n* and the arithmetic function unit 43 again, and the encrypted contents data which has been settled accounts is downloaded from the arithmetic function unit 43 to the client apparatuses 11-*n*.

As explained above, according to the network system 1, the client apparatuses 11-*n* downloads the encrypted data from the arithmetic function unit 43 without passing a firewall, therefore the response is good.

Further, according to the network system 1, establishment of communication between the client apparatuses 11-*n* and the arithmetic function unit 43 is performed based on the communication information acquired by the communication between the client apparatuses 11-*n* and the arithmetic function unit 43 through the firewall function unit 31, therefore the safety of procedure can be increased.

Further, according to the network system 1, the arithmetic function unit 43 may execute the server application program PRG-SA corresponding to the client application program PRG-T which the client equipment client apparatuses 11-*n* performs, therefore the flexibility of application composition increases Further, according to the network system 1, a construction of the application as a network including two or more client apparatuses 11-*n* and a server becomes easy by operating individually the front end server function unit 33 and the arithmetic function unit 43. That is, it is easy to construct the application including the function of the client apparatuses 11-*n* and the server which is not the constitution for connecting the independent node and function thereof.

Note that, the network system 1 can realize the server center 21 as a server apparatus which functions as network OS or network middleware.

The server center 21 realizes an internal processor network effectively by combining a network connection between internal processors and a server network connection of conventional type.

The present invention is not limited to the above embodiments.

It will be appreciated by those skilled in the art which various modifications, combinations, sub-combinations, and replacements may be made in part or all of the components within the technical scope and its equivalents of the present invention.

For example, although the case where the firewall function unit 31 assigned a global IP address to the arithmetic function unit 43 by the STUN function is illustrated in the embodiment mentioned above, you may assign by functions other than a STUN function.

Although the case where the arithmetic function unit 43 receives contents data through the firewall function unit 39 from the back end server function unit 37 is illustrated in the embodiment mentioned above, it is not necessary to form the firewall function unit 39 or, and it may download contents data from servers other than the server center 21.

Figure 9:
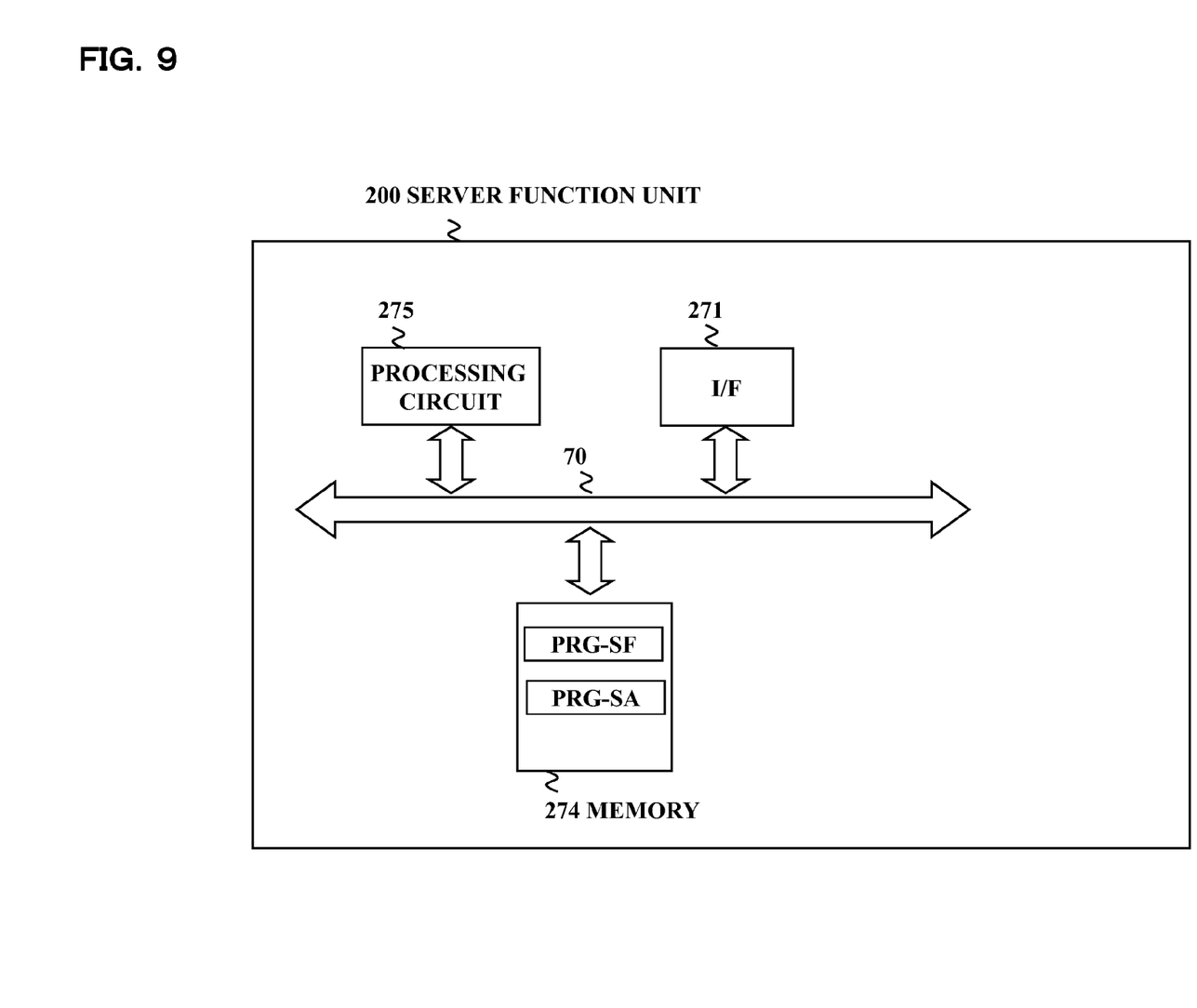
FIG. 9 is a schematic view of a network system in accordance with a modification of an embodiment of the present invention.

Further, each function of the server center 21 shown in FIG. 1 may be realized by the same or different any of hardware, as long as each exists as a functional module. For example, as shown in FIG. 9, you may form the server function unit 200 which realizes the function of the both sides of the arithmetic function unit 43 shown in the front end server function unit 33 and FIG. 4 showing in FIG. 3.

In this case, the program PRG-SF and PRG-SA mentioned above will be memorized in the memory 274 of the server function unit 200, and the processing unit 275 executes these programs to communicate with the client apparatuses 11-*n* through the interface 271 to obtain the function of the both sides of the front end server function unit 33 and the arithmetic function unit 43.

This invention is applicable to the communication system which performs communication via firewall.

EXPLANATION OF REFERENCE

11-*n* client apparatus
21 server center
31 firewall function unit
33 front end server function unit
35 firewall function unit
37 back end server function unit
39 firewall function unit
41 NAT function unit
42 mediator unit
43 arithmetic function unit
45-1 to 45-*m* arithmetic function module
61 interface
62 display
63 operation unit
64 memory
65 processing circuit
71 interface
74 memory
75 processing circuit
81 interface
84 memory
85 processing circuit
101 cruise management unit
103 cache management unit
105 local cache
107 automatic cruise processing unit
109 viewer
111 audio management unit
113 rendering unit

The invention claimed is:

1. A server system, comprising:
a firewall;
a first server for connecting with a client apparatus via said firewall; and
a second server for connecting with said client apparatus without passing through said firewall, said second server including a plurality of operation functional modules, and each operation functional module executing a respective application program individually, wherein
said first server assigns a respective unique combination of a global address and a port to each of said operation functional modules,
said first server communicates with said client apparatus via said firewall and transmits communication information, including at least one of the unique combinations, to said client apparatus, and
said client apparatus communicates with said second server without passing through the firewall via one of the plurality of operation functional modules assigned with the at least one of the unique combinations of global address and port contained in the communication information, such that the client apparatus communicates with the one of the plurality of operation functional modules and the respective application program executing thereon based on a communication protocol different from a communication protocol with said first server by using said communication information received from said first server.

2. The server system of claim 1, wherein said second server transmits said communication information indicating addresses of said second server on a network.

3. The server system of claim 2,
further comprising an address conversion means for performing address conversion between the global address which specifies said second server globally on the network at the time of communication between said client apparatus and said second server and a local address which specifies said second server at the side of said first server and said second server.

4. The server system of claim 1, wherein
said first server starts a client application downloaded to said client apparatus, and
said second server performs communication with the started client application of said client apparatus.

5. The server system of claim 4, wherein said second server executes a server application program corresponding to said client application executed by said client apparatus.

6. The server system of claim 5, wherein
said second server acquires application information on the network, and transmits said application information to said client apparatus; and
said client apparatus acquires said client application program based on said application information acquired from said second server.

7. The server system of claim 1, wherein said second server executes said server application program by at least one management processor and a plurality of calculation execution processors.

8. The server system of claim 1, wherein a function of said first server and said second server is realized by the same circuit or different processing circuit.

9. A communication method, comprising:
providing a firewall;
providing a first server for connecting with a client apparatus via said firewall;
providing a second server for connecting with said client apparatus without passing through said firewall, said second server including a plurality of operation functional modules, and each operation functional module executing a respective application program individually;
assigning, via said first server, a respective unique combination of a global address and a port to each of said operation functional modules, wherein:
the first server communicates with the client apparatus via the firewall and transmits communication information, including at least one of the unique combinations, to said client apparatus, and
said client apparatus communicates with said second server without passing through the firewall via one of the plurality of operation functional modules assigned with the at least one of the unique combinations of global address and port contained in the communication information, such that the client apparatus communicates with the one of the plurality of operation functional modules and the respective application program executing thereon based on a communication protocol different from a communication protocol with said first server by using said communication information received from said first server.

10. A computer, comprising:
an interface for transmitting and receiving data used for communication with a first server through a firewall of the first server and data used for communication with a second server without passing through said firewall, wherein: (i) said second server includes a plurality of operation functional modules and each operation functional module executes a respective application program individually, (ii) the first server assigns a respective unique combination of a global address and a port to each of said operation functional modules, and (iii) the first server communicates through the firewall, and via the interface, and transmits communication information, including at least one of the unique combinations, to the computer; and
a processing circuit for performing communication processing with said second server without passing through said firewall via one of the plurality of operation functional modules assigned with the at least one of the unique combinations of global address and port contained in the communication information, such that the processing circuit communicates with the one of the plurality of operation functional modules and the respective application program executing thereon based on a communication protocol different from a communication protocol with said first server by using the communication information received from said first server.

11. The computer of claim 10, wherein said processing circuit performs communication processing with said first server and said second server which are realized by the same circuit or different processing circuit.

12. A computer including at least one processor for executing a computer program, which causes the computer to execute steps, comprising:
a receiving step for receiving a-communication information used for communication with a second server from a first server through a firewall of the first server, wherein: (i) said second server includes a plurality of operation functional modules and each operation functional module executes a respective application program individually, (ii) the first server assigns a respective unique combination of a global address and a port to each of said operation functional modules, and (iii) the first server communicates through the firewall, and via the interface, and transmits the communication information, including at least one of the unique combinations, to the computer, and a communication step for communicating with said second server without passing through said firewall via one of the plurality of operation functional modules assigned with the at least one of the unique combinations of global address and port contained in the communication information, such that the computer communicates with the one of the plurality of operation functional modules and the respective application program executing thereon based on a communication protocol different from a communication protocol with said first server by using said communication information received at said receiving step.

13. A non-transitory, computer readable storage media storing a program to be executed by a computer, said program operating to cause the computer to execute steps comprising:

a receiving step for receiving a-communication information used for communication with a second server from a first server through a firewall of the first server, wherein: (i) said second server includes a plurality of operation functional modules and each operation functional module executes a respective application program individually, (ii) the first server assigns a respective unique combination of a global address and a port to each of said operation functional modules, and (iii) the first server communicates through the firewall, and via the interface, and transmits the communication information, including at least one of the unique combinations, to the computer, and a communication step for communicating with said second server without passing through said firewall via one of the plurality of operation functional modules assigned with the at least one of the unique combinations of global address and port contained in the communication information, such that the computer communicates with the one of the plurality of operation functional modules and the respective application program executing thereon based on a communication protocol different from a communication protocol with said first server by using said communication information received at said receiving step.

\* \* \* \* \*